J. BURTON.
Shuttle-Motion for Looms.

No. 216,508. Patented June 17, 1879.

Witnesses
John Becker
Fred. Haynes

Inventor
Joseph Burton
by his Attorneys
Brown & Allen

UNITED STATES PATENT OFFICE.

JOSEPH BURTON, OF NEWARK, ASSIGNOR OF ONE-HALF HIS RIGHT TO ALFRED FAULKNER, OF JERSEY CITY, NEW JERSEY.

IMPROVEMENT IN SHUTTLE-MOTIONS FOR LOOMS.

Specification forming part of Letters Patent No. 216,508, dated June 17, 1879; application filed September 12, 1878.

*To all whom it may concern:*

Be it known that I, JOSEPH BURTON, of Newark, in the county of Essex and State of New Jersey, have invented certain new and useful Improvements in Shuttle-Motions for Looms, of which the following is a description, reference being had to the accompanying drawings, forming part of this specification.

This invention more especially relates to positive-motion looms, in which the shuttle-driver is fitted with fingers that alternately engage with opposite ends of the shuttle, to project the latter alternately in opposite directions through the shed.

The invention consists in certain novel combinations of devices, whereby a very perfect, smooth, and easy shuttle-driving motion is obtained.

Figure 1:
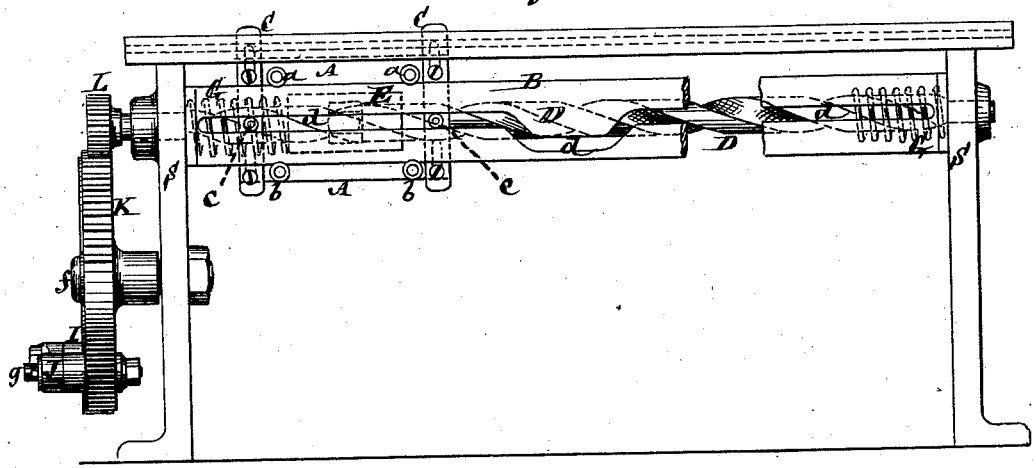
Figure 2:
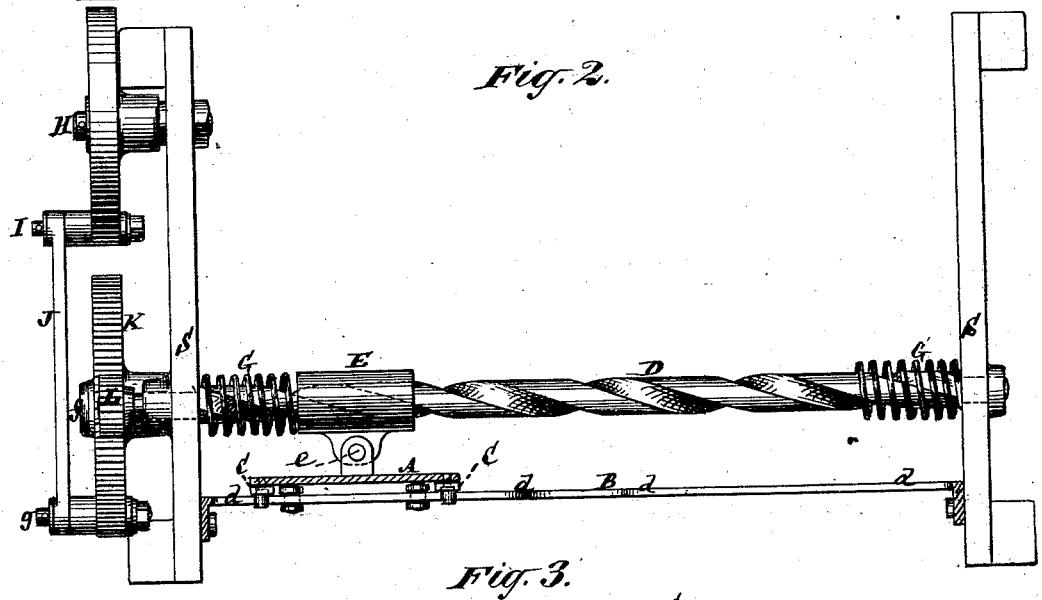
Figure 3:
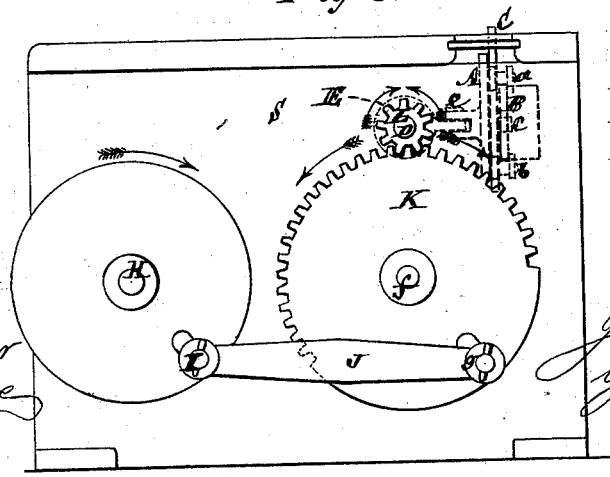

In the accompanying drawings, Figure 1 represents an elevation, in direction of the length of the shuttle-race, of that portion of a positive-motion loom which relates to, or has combined with it, the means for actuating and controlling the motion of the shuttle-driver. Fig. 2 is a plan or horizontal sectional view of the same, and Fig. 3 an end view thereof.

A is the shuttle carrier or driver, which is fitted to reciprocate in or along a straight race, and is guided in such action by upper and lower rollers, $a$ $b$, arranged to travel along upper and lower edges of a plate or bar, B.

The fingers C C, which alternately engage with and disengage from opposite ends of the shuttle, are fitted to slide up and down and within or up through the shuttle carrier or driver A, and are actuated alternately in reverse directions, up and down, to pass the shuttle through the shed without striking or catching the latter, by means of studs or rollers $c$ $c$ on said fingers traveling within and along a straight and double-cammed groove or slot, $d$ $d$, in the bar B.

The means for operating the shuttle-driver consist, in part, of a longitudinally-arranged screw, D, having an alternate reverse rotary movement, and a nut, E, fitted to said screw, and connected with or attached to the shuttle-driver, so that as said screw is alternately reversed in its rotary movement, it will move the nut E and the shuttle carrier or driver A alternately in opposite straight directions, and cause the fingers C C to alternately engage with and disengage from opposite ends of the shuttle. This motion of the screw D—which latter should be of a quick or coarse pitch—obtains for the shuttle-driver a very smooth or easy, comparatively noiseless, and perfect action for said driver. The nut E may be connected with the shuttle driver or carrier A by a pin or bolt, $e$.

G G are spiral springs arranged around opposite ends of the screw D, within the side frames, S S, of the loom. These springs, which are alternately struck by the nut E as the latter is moved by the screw D first in one direction and then in the other, are of such tension as to just overcome the momentum of the shuttle, shuttle-driver, and nut, and so to stop the latter without shock, and to start them in their movement. The screw D also serves as a mandrel to carry said springs.

The rotation of the screw D alternately in reverse directions is obtained from a shaft, H, arranged to rotate in one direction. This is done by means of a crank or crank-pin, I, attached to the shaft H, and connected by a rod, J, with a crank-pin, $g$, of a vibrating toothed sector, K, which is fitted to work on a fulcrum, $f$, and which gears with a pinion, L, on the screw D. Such forms a very simple and efficient means for actuating the screw, and the rotating crank-pin I is so arranged that it comes to a stop or reaches its dead-center at the end of the stroke of the shuttle-carrier in either direction, and gives the greatest velocity where requisite—that is, at the middle of the shuttle's stroke. The cranks or crank-pins I and $g$ may also be made adjustable, and afford convenient provision for varying the stroke of the shuttle for weaving narrower or wider goods.

I claim—

1. The combination, with the shuttle-driver A, having supporting wheels or rollers $a$ $b$, and sliding fingers C, having projecting pins $c$, of the rail B, having the cam-slot $d$, the nut E, connected to the shuttle-driver, the continuous screw carrying said nut, and equal in length to the entire throw of the shuttle, and mechanism, substantially as described, for imparting to said screw an alternate rotary motion, essentially as set forth.

2. The combination of the rotating crank or crank-pin I, the rod J, the toothed sector K, the crank-pin g, the pinion L, the screw D, having an alternate rotary motion, the nut E, and the shuttle carrier or driver A, substantially as specified.

JOSEPH BURTON.

Witnesses:
OWEN PRENTISS,
FRED. HAYNES.